United States Patent
Folmar

[11] 3,826,941
[45] July 30, 1974

[54] DOVETAILED STATOR STRUCTURE

[75] Inventor: Reginald J. Folmar, Owen Township, Winnebago County, Ill.

[73] Assignee: Barber-Colman Company, Rockford, Ill.

[22] Filed: Feb. 16, 1973

[21] Appl. No.: 332,888

[52] U.S. Cl. ............................................. 310/217
[51] Int. Cl. ............................................. H02k 1/06
[58] Field of Search .......................... 310/216–218, 310/258, 49, 172, 51, 162–164

[56] References Cited
UNITED STATES PATENTS

| | | | |
|---|---|---|---|
| 1,884,115 | 10/1932 | Morrill | 318/208 |
| 2,010,869 | 8/1935 | Lilja | 318/208 |
| 2,047,487 | 7/1936 | O'Leary | 310/172 |
| 2,064,090 | 12/1936 | Sullivan | 310/172 |
| 3,370,189 | 2/1968 | Haydon | 310/172 |
| 3,502,922 | 3/1970 | Welker | 310/172 |

*Primary Examiner*—R. Skudy
*Attorney, Agent, or Firm*—A. Richard Koch

[57] ABSTRACT

The stator of a shaded pole motor comprises complementary stacks of laminations dovetailed together at their interface to prevent noise producing vibrations.

7 Claims, 5 Drawing Figures

PATENTED JUL 30 1974 3,826,941

3,826,941

DOVETAILED STATOR STRUCTURE

BACKGROUND OF THE INVENTION

This invention relates to the construction and assembly of laminated stator cores as used in shaded-pole motors. It represents an improvement upon an invention of Oscar L. Welker as disclosed in U.S. Pat. No. 3,502,922. Welker interlocked two stacks of stator laminations within the field coil, but resorted to plane butt engagement between the stacks in each of the bridges adjacent the rotor. It has been found that such abutments permit vibration of the abutting ends of the laminations, producing undersirable noise.

SUMMARY OF THE INVENTION

This invention eliminates or greatly reduces noise produced by vibration in the bridge portions of the stator in shaded-pole motors similar to that disclosed in the aforesaid Welker patent, while retaining all of the advantages of the Welker invention.

DESCRIPTION OF THE PREFERRED EMBODIMENT

Figure 1:
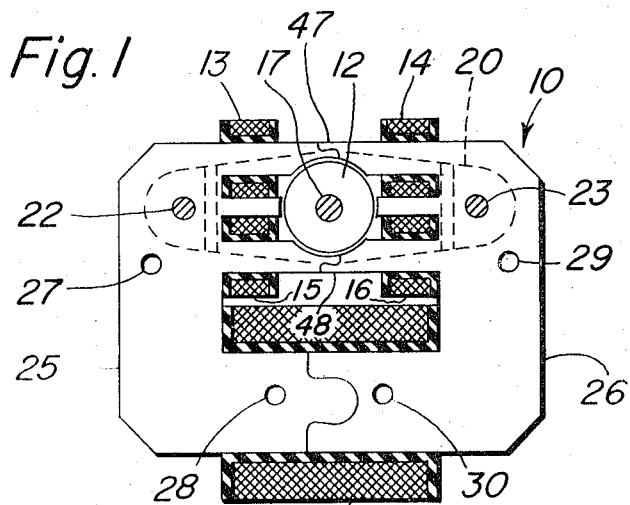
FIG. 1 is a cross-sectional view of a reversible shaded-pole motor embodying this invention, the view being taken along an end of the stator core, as indicated by the line 1—1 of FIG. 2.
Figure 4:
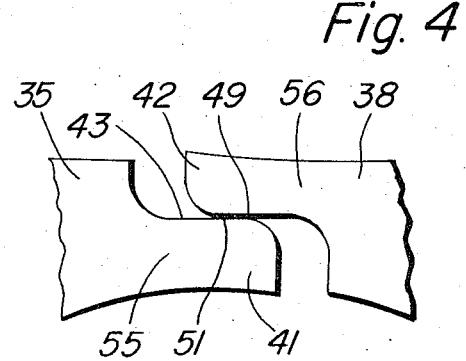
FIGS. 4 and 5 are enlarged fragmentary views showing a deflected relationship between portions of the complementary laminations as they are being assembled.
Figure 2:
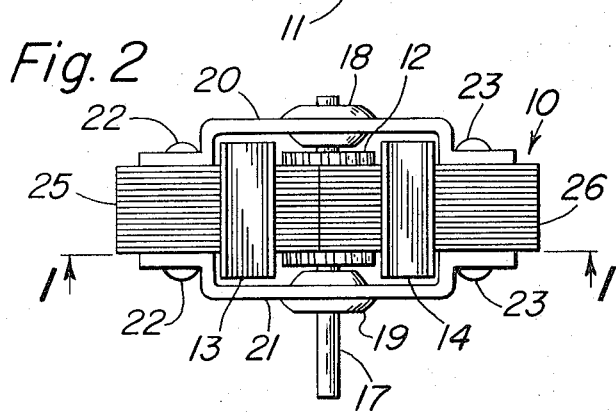
FIG. 2 is a plan view of the motor shown in FIG. 1.

As shown in the drawings for purposes of illustration, the invention is embodied in a reversible shaded-pole motor. The stator 10 provides a path for an alternating magnetic field in response to energization of a field coil 11 by alternating current. A squirred-cage rotor 12 rotates in forward or reverse direction in response to selective closure of shading coils 13, 14, 15, 16, the rotor being fixed on a shaft 17 supported for rotation in bearings 18, 19. The bearings are mounted in end plates 20, 21 affixed to opposite faces of the stator 10, as by rivets 22, 23. The construction and operation of reversing shaded-pole motors of the type described is well known and will not be further described.

Figure 3:
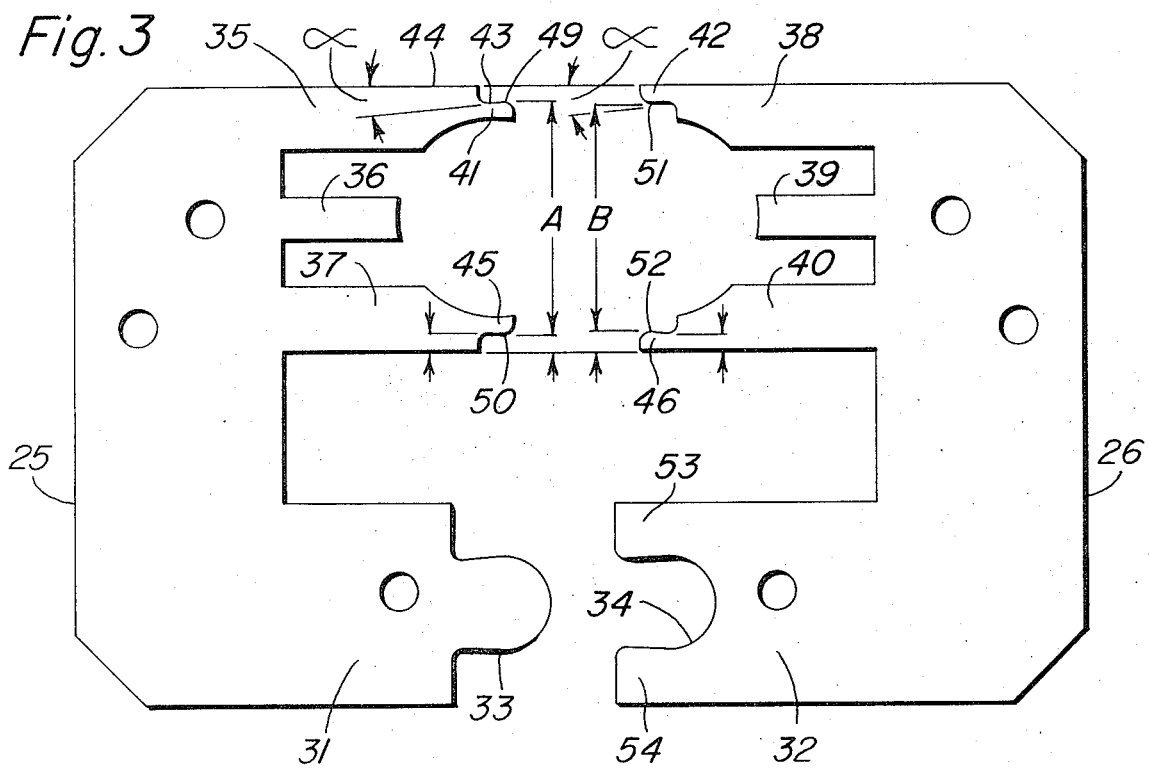
FIG. 3 is an elevational view of the complementary stator laminations used in the motor shown in FIG. 1.

The stator 10 is composed of two core sections, shown as two stacks of laminations 25, 26, secured together as by rivets 27, 28 and 29, 30 respectively. The laminations are shown, separated and enlarged, in FIG. 3. The laminations 25, 26 are generally U-shaped and are symmetrical except in the mating regions. The legs 31, 32 are adapted to be joined together by interfitting elements 33, 34, as described in the aforesaid Welker patent. One of the remaining legs is trifurcated to form shading pole 35, main pole 36 and shading pole 37, while the other is trifurcated to form shading pole 38, main pole 39 and shading pole 40. The poles 35, 36, 37, 38, 39, 40 are shaped to provide a rotor recess when the laminations 25, 26 are assembled together, the recess being concentric with the rotor 12 and supplying the necessary clearance for the rotor. The ends 41, 42 of shading poles 35, 38 are terminated in complementary S-shapes, the common tangent 43 to the reverse curves of the S-shape forming a reentrant angle $\alpha$ with the axis (shown here as edge 44) along which the laminations 25, 26 are to be moved while being joined. In like manner ends 45, 46 of shading poles 37, 40 are terminated in complementary S-shapes, preferably, as shown, as mirror images of ends 41, 42, respectively. Such complementary end shapes may be formed by a shearing operation separating laminations 25, 26 from each other. The tangents (such as 43) on ends 41, 42 and 45, 46, respectively, form interlocking tapers when the laminations 25, 26 are assembled together to form magnetic bridges comprising shading poles 35, 38 and 37, 40, respectively, around the rotor recess. The tapers act as wedges to draw the laminations closer together and to retain the complementary ends 41, 42 and 45, 46, respectively, in edge-to-edge engagement. The ends 41, 45 could also be described as having projections 49, 50 extending laterally away from each other, the extremeties of which are separated by a predetermined distance A. The ends 42, 46, complementary to ends 41, 45, have projections 51, 52 extending laterally toward each other, the extremeties of which are separated by a predetermined distance B, the distance B being less than distance A.

As in the aforesaid Welker patent, the shading coils 13, 14, 15, 16 are mounted to encircle the shading poles 35, 38, 37, 40, respectively, and the field coil 11 is mounted to surround the legs 31, 32 before the core sections comprising laminations 25, 26 are assembled together to form stator 10. As the core sections are pressed together along an axis defined above as represented by edge 44, the resilient ears 53, 54 forming the interfitting element 34 are spread apart to permit entrance of interfitting element 35, after which the ears return toward their original positions as they are moved along the periphery of element 33. In fully assembled position the elements 33, 34 are in edge-to-edge engagement along substantially their entire complementary peripheries.

Figure 5:
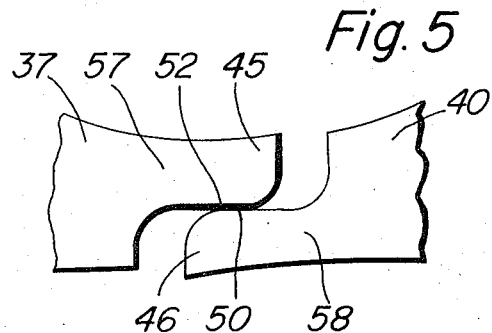

According to the present invention, while the core sections comprising laminations 25, 26 are being pressed toward assembled position, the resilient complementary ends 41, 42 and 45, 46 come into engagement and are deflected mainly in the regions 55, 56, 57, 58, as shown in FIGS. 5, 6. As the sections are pressed further toward assembled position the projection 51 moves downwardly along the tangent 43 while end 41 returns toward its normal position until the complementary ends 41, 42 are in substantially complete edge-to-edge engagement. At the same time, and in like manner, the projections 49, 50, 52 are moved along the tangents on ends 42, 46, 45, respectively, until the complementary ends are in substantially complete edge-to-edge engagement when the laminations 25, 26 are in assembled position. Because the distance A between the outward extremeties of projections 49, 50 is normally greater than distance B between the inward extremeties of projections 51, 52, the complementary ends 41, 42 and 45, 46 will be interlocked in assembled position. As a result of the reentrant tangent angles, such as $\alpha$, and the resilience of the complementary ends 41, 42 and 45, 46, the complementary ends will be drawn toward each other by a wedging action after the extremities of projections 49, 51 and 50, 52 have passed over each other as the laminations 25, 26 approach assembled position.

As a result of irregularities in the peripheries of the ends 41, 42, 45, 46, there will ordinarily be some residual compression between the complementary ends when in assembled condition, causing a mechanical resistance to motion in any direction, and so preventing production of audible sound. This is especially important when the sections comprise laminations that may vibrate in the alternating magnetic field set up in the stator 10. Since an effective air gap is still provided in the bridges, harmonics are suppressed and other benefits of the Welker construction are still available.

It will be apparent to those skilled in the art that many embodiments of this invention are possible. For example it could be employed in a uni-directional shaded-pole motor of the type disclosed by Edgar D. Lilja in U.S. Pat. No. 2,105,666. The laminations need not be secured together in stacks, but could be separate. If separate, the laminations could be alternated singly or in groups to reverse the locations of some of the laminations 25, 26 and thus further restrain vibration. This however would complicate the assembly operation and result in a lower stacking factor, so that using like laminations in a core section is desirable. The scope of this invention is limited only by the claims.

I claim:

1. In a shaded pole electric motor, a stator core comprising opposed pairs of shading poles providing magnetic bridges adjacent a rotor recess, complementary ends of said poles in interlocking engagement in each of said bridges, first projections extending laterally toward each other on respective ends of one of said pairs of poles, the extremities of said projections separated by a first predetermined distance, and second projections extending laterally away from each other on respective ends of the other of said pairs of poles, the extremities of said second projections separated by a second predetermined distance, said first distance being smaller than said second distance to provide said interlocking engagement.

2. A stator core according to claim 1 wherein said core core comprises laminations.

3. A stator core according to claim 1 wherein said ends are resilient to permit deflection of the ends while being moved into said interlocking engagement.

4. A stator structure according to claim 1 wherein said complementary ends provide an edge-to-edge abutment while in said interlocking engagement.

5. A stator structure according to claim 1 wherein said complementary ends comprise interfitting reentrant portions to provide the interlocking engagement.

6. A stator structure according to claim 1 wherein said complementary ends comprise interfitting tapered portions providing a wedging action to retain the ends in engagement.

7. A stator core according to claim 2 wherein the laminations are secured together in stacks.

* * * * *

UNITED STATES PATENT OFFICE
CERTIFICATE OF CORRECTION

Patent No. 3,826,941     Dated July 30, 1974

Inventor(s) Reginald J. Folmar

It is certified that error appears in the above-identified patent and that said Letters Patent are hereby corrected as shown below:

In claim 4, line 1, change "structure" to --core--.

In claim 5, line 1, change "structure" to --core--.

In claim 6, line 1, change "structure" to --core--.

Signed and sealed this 15th day of October 1974.

(SEAL)
Attest:

McCOY M. GIBSON JR.
Attesting Officer

C. MARSHALL DANN
Commissioner of Patents